(No Model.)
S. KIMBLE.
PIPE COUPLING.
No. 301,900. Patented July 15, 1884.
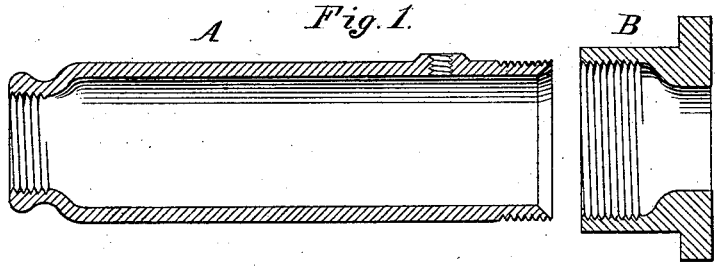
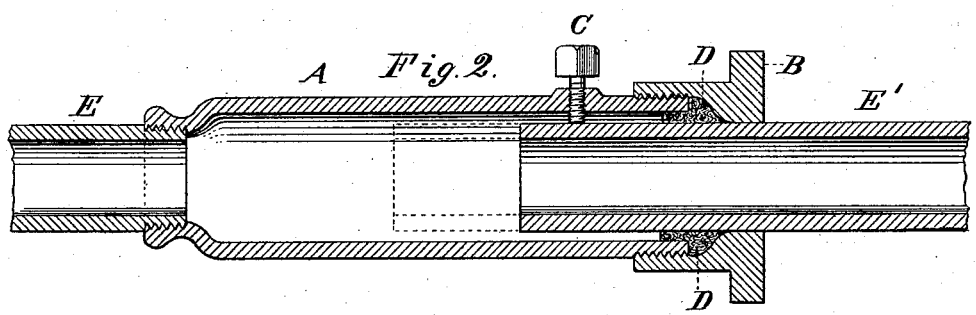
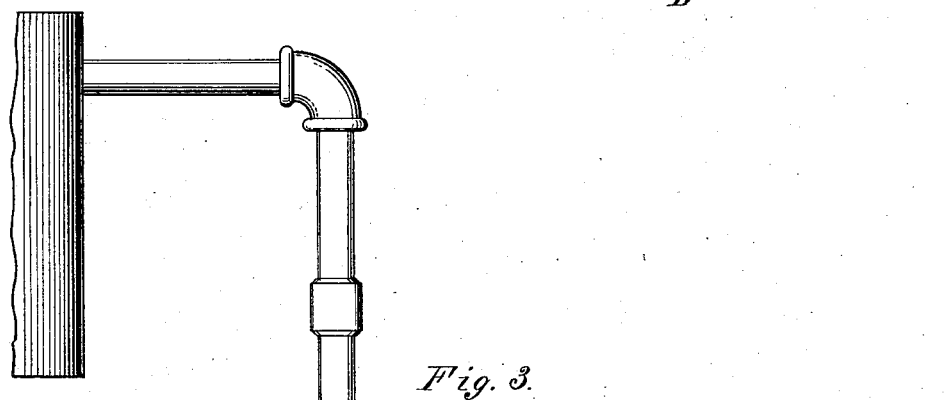
WITNESSES
Villette Anderson.
Theo. Munger.
INVENTOR
Sam. Kimble
by Anderson & Smith
his ATTORNEYS

UNITED STATES PATENT OFFICE.

SAMUEL KIMBLE, OF MANHATTAN, KANSAS.

PIPE-COUPLING.

SPECIFICATION forming part of Letters Patent No. 301,900, dated July 15, 1884.

Application filed October 16, 1883. (No model.)

*To all whom it may concern:*

Be it known that I, SAMUEL KIMBLE, a citizen of the United States, residing at Manhattan, in the county of Riley and State of Kansas, have invented certain new and useful Improvements in Pipe-Couplings; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of this invention, showing different parts in section. Fig. 2 is a longitudinal section. Fig. 3 is a side view.

This invention has relation to pipe-couplings; and it consists in the construction and novel arrangement of devices, as will be hereinafter fully described, and particularly pointed out in the claim appended.

Referring by letter to the accompanying drawings, A designates a long sleeve, with an internal thread at the left-hand end of a line of pipe, E, of suitable size, while the remainder or right-hand portion of the sleeve A is made of a size on the inside to slip over the pipe E', to be connected. When the pipe E' has been entered into the sleeve A, the packing-cap B having been previously slipped on the pipe E', the set-screw C is screwed down to hold the pipe E' true while making the connection or coupling. The packing-cap B is provided with packing D D, which may be of hemp or cotton-waste with white or red lead; or rubber rings or other suitable packing may be used. The cap is then screwed up to place. The cap B should be hexagonal in outline in cross-section, so that a wrench may be used to screw it home.

With my coupling, even if the pipe is not cut to the inch, yet I can extend or slip together, as required, and have the pipe fit the walls nicely.

Fig. 3 shows the coupling applied to a line of pipe fast at both ends.

The advantages of this coupling are obvious, and need no further description.

I am aware that it is not new to provide a pipe-coupling with a thread at opposite ends to receive pipe-sections, and the coupling-sleeve having at one end a threaded perforated cap, and that pipe-couplings have also been provided with a perforation to receive a set-screw; but in neither case has the coupling-sleeve been formed of a single piece having one end reduced and internally threaded, and the opposite end provided with an enlarged externally-threaded aperture and a threaded perforation to receive a set-screw.

Having thus fully described my invention, what I claim as new, and desire to secure by Letters Patent, is—

The pipe-coupling herein described, consisting of the sleeve A, constructed as shown, formed of a single piece, having one end reduced and internally threaded to receive a section of pipe, its opposite end enlarged and externally threaded to receive the internally-threaded cap B, having an aperture for the insertion of the main pipe E', and a packing, D, interposed between the sleeve, the cap B, and the main pipe E', the said sleeve being provided with a threaded perforation to receive the set-screw C, whereby the coupling-sleeve is adapted to receive pipes of various diameters, substantially as specified.

In testimony whereof I affix my signature in presence of two witnesses.

SAMUEL KIMBLE.

Witnesses:
WM. P. HIGINBOTHAM,
E. L. SCOTT.